(12) United States Patent
Devarapalli et al.

(10) Patent No.: US 9,760,287 B2
(45) Date of Patent: *Sep. 12, 2017

(54) METHOD AND SYSTEM FOR WRITING TO AND READING FROM COMPUTER READABLE MEDIA

(71) Applicant: Dell Products L.P., Round Rock, TX (US)

(72) Inventors: Kiran Kumar Devarapalli, Bangalore (IN); Avinash Bendigeri, Dharwad (IN); Karan Gandhi, Gurgaon (IN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,736

(22) Filed: Jun. 7, 2016

(65) Prior Publication Data

US 2016/0283131 A1 Sep. 29, 2016

Related U.S. Application Data

(63) Continuation of application No. 14/329,574, filed on Jul. 11, 2014, now Pat. No. 9,423,965.

(51) Int. Cl.
*G11B 7/005* (2006.01)
*G11B 7/00* (2006.01)
(Continued)

(52) U.S. Cl.
CPC ............ *G06F 3/0605* (2013.01); *G06F 3/061* (2013.01); *G06F 3/064* (2013.01); *G06F 3/0613* (2013.01);
(Continued)

(58) Field of Classification Search
CPC ..... G06F 2003/0692; G06F 2003/0697; G06F 3/0601; G06F 3/061; G06F 3/0665;
(Continued)

(56) References Cited

U.S. PATENT DOCUMENTS 6,826,650 B1 * 11/2004 Krantz ................. G06F 3/0613
369/30.23
8,838,887 B1 * 9/2014 Burke ................. G06F 3/0611
711/112

(Continued)

OTHER PUBLICATIONS

Dell Compellent, "Dell Compellent FS8600, Network-Attached storage (NAS), Networking Best Practices Guide," Dell Compellent Technical Solutions Group, © 2013 Dell Inc., Jul. 2013, 20 pages.

*Primary Examiner* — Dionne H Pendleton
(74) *Attorney, Agent, or Firm* — Baker Botts L.L.P.

(57) ABSTRACT

According to one embodiment, a method includes receiving a write request and determining a first portion of information associated with the write request. The method additionally includes determining a first location on a first disk to write the first portion of information and, based on the determined first location on the first disk, determining a second location on a second disk to write the first portion of information. The method further includes writing the first portion of the information to the first location on the first disk. The first location comprises an outer track of the first disk. The method further includes writing the first portion of the information to the second location on the second disk, the second location comprising an inner track of the second disk.

22 Claims, 9 Drawing Sheets

(51) Int. Cl.
*G06F 12/00* (2006.01)
*G06F 3/06* (2006.01)
*G11B 20/10* (2006.01)

(52) U.S. Cl.
CPC .......... *G06F 3/0644* (2013.01); *G06F 3/0659* (2013.01); *G06F 3/0665* (2013.01); *G06F 3/0674* (2013.01); *G06F 3/0689* (2013.01); G06F 2003/0692 (2013.01); G11B 2020/1087 (2013.01); *G11B 2020/10916* (2013.01); *G11B 2020/10925* (2013.01); *G11B 2020/10935* (2013.01)

(58) Field of Classification Search
CPC .... G06F 3/0689; G06F 3/0613; G06F 3/0659; G06F 3/0605; G06F 3/0638; G06F 3/064; G06F 3/0644; G06F 3/0676; G06F 12/0607; G06F 12/0868; G06F 3/0604; G06F 3/06; G06F 2211/1011; G06F 2211/1028; G06F 2211/1076; G06F 2211/1078; G06F 2211/1092; G06F 2212/262; G06F 3/0674; G06F 3/0655; G06F 3/0614; G06F 3/0685; G11B 2020/10537; G11B 20/10; G11B 2020/10925; G11B 7/00736; G11B 7/24038; G11B 2007/0013; G11B 2020/1087; G11B 2020/10935; G11B 2020/1239; G11B 2020/1282; G11B 20/1217; G11B 20/1254; G11B 2020/10916; G11B 2020/10825; H04N 21/2182; H04N 21/2312; H04N 5/781; H04N 9/8042; H04N 9/8063

See application file for complete search history.

(56) References Cited

U.S. PATENT DOCUMENTS

| | | | |
|---|---|---|---|
| 2003/0151992 A1* | 8/2003 | Fujimoto | G11B 19/047 369/47.14 |
| 2003/0161233 A1* | 8/2003 | Sako | G11B 20/0021 369/47.24 |
| 2003/0221065 A1* | 11/2003 | Inagaki | G06F 3/0611 711/114 |
| 2004/0225833 A1* | 11/2004 | Fure | G06F 3/061 711/114 |
| 2008/0313398 A1* | 12/2008 | Koseki | G06F 3/0613 711/114 |
| 2009/0106493 A1 | 4/2009 | Tsuji | |
| 2014/0281194 A1 | 9/2014 | Gaertner et al. | |
| 2015/0109894 A1 | 4/2015 | Shimomai et al. | |
| 2016/0011778 A1* | 1/2016 | Devarapalli | G06F 3/061 711/114 |

\* cited by examiner

METHOD AND SYSTEM FOR WRITING TO AND READING FROM COMPUTER READABLE MEDIA

RELATED APPLICATIONS

This application is a continuation application of U.S. patent application Ser. No. 14/329,574, titled "Improved Method and System for Writing To and Reading from Computer Readable Media," which was filed on Jul. 11, 2014.

TECHNICAL FIELD

This disclosure relates generally to information handling systems and more particularly to reading from and writing to computer readable media.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. For example, an information handling system may be a tablet computer or mobile device (e.g., personal digital assistant (PDA) or smart phone) configured to transmit data on a wireless communications network. Information handling systems may include a variety of hardware and software components that may be configured to process, store, and communicate information and may include one or more computer systems, data storage systems, and networking systems.

As speed becomes increasingly important in information handling systems, pressure increases for faster and more effective read and write performance. Various solutions, such as Redundant Array of Inexpensive Disks (RAID), have attempted to address these issues. But, in certain situation, current performance is unsatisfactory.

SUMMARY

In one embodiment, a method includes receiving a write request and determining a first portion of information associated with the write request. The method additionally includes determining a first location on a first disk to write the first portion of information and, based on the determined first location on the first disk, determining a second location on a second disk to write the first portion of information. The method further includes writing the first portion of the information to the first location on the first disk. The first location comprises an outer track of the first disk. The method further includes writing the first portion of the information to the second location on the second disk, the second location comprising an inner track of the second disk.

In one embodiment, a method includes receiving a read request for a first information stored on both a first disk and a second disk. The method further includes determining a first location on the first disk corresponding to the read request. The method additionally includes determining whether the first location is an outer track of the first disk, and, in response to determining that the first location is an outer track of the first disk, directing the read request to the first disk rather than the second disk.

In one embodiment, a system includes a processor, a memory communicatively coupled to the processor, and a controller communicatively coupled to the processor and the memory. The controller is configured to receive a write request and determine a first portion of information associated with the write request. The controller is further configured to determine a first location on a first disk to write the first portion of information, and, based on the determined first location on the first disk, determine a second location on a second disk to write the first portion of information. The controller is additionally configured to write the first portion of the information to the first location on the first disk. The first location comprises an outer track of the first disk. The controller is additionally configured to write the first portion of the information to the second location on the second disk, the second location comprising an inner track of the second disk.

In one embodiment, a system includes a processor, a memory communicatively coupled to the processor, and a controller communicatively coupled to the processor and the memory. The controller is configured to receive a read request for a first information. The first information is stored on both a first disk and a second disk. The controller is additionally configured to determine a first location on the first disk corresponding to the read request. The controller is further configured to determine whether the first location is an outer track of the first disk, and, in response to determining that the first location is an outer track of the first disk, direct the read request to the first disk rather than the second disk.

Certain embodiments of the present disclosure may provide one or more technical advantages. A technical advantage of one embodiment includes information on a hard disk drive being more readily accessible by placing it on an outer track of at least one of the stored disks. Another technical advantage includes faster read times and reduced delay in accessing information stored on a hard disk drive in an information handling system.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Reference is now made to the following description taken in conjunction with the accompanying drawings, wherein like reference numbers represent like parts, and which.

DETAILED DESCRIPTION

Figure 1:
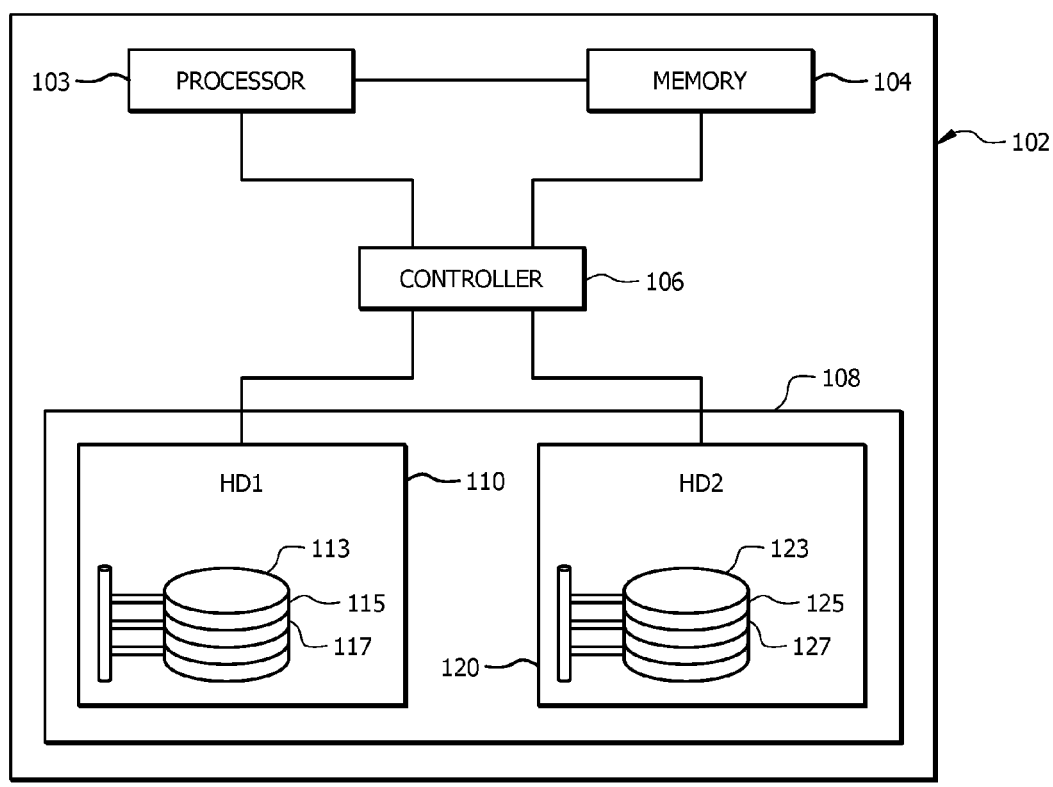
FIG. 1 illustrates a block diagram of an example of an information handling system in accordance with some embodiments of the present disclosure.

FIG. 1 illustrates a block diagram of an example of information handling system 102. In certain embodiments, information handling system 102 comprises processor 103, memory 104, controller 106, disk array 108, disk drive 110, and disk drive 120. System 102 may read and write data to disk drive 110 and disk drive 120. Controller 106 may choose where on each of disk drives 110 and 120 to write the same data, such as choosing to write the same data to an inner track of one of disk drives 110 and 120 and an outer track of the other of disk drives 110 and 120. In response to receiving a read request for a portion of data that is stored on both disk drives 110 and 120, controller 106 may choose which of disk drives 110 and 120 to read the portion of data from based on which of disk drives 110 and 120 have the portion of data stored on an outer track.

Information handling system 102 may include any instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, information handling system 102 may be a personal computer, a PDA, a consumer electronic device, a network storage device, or another suitable device and may vary in size, shape, performance, functionality, and price. Information handling system 102 may include memory, one or more processing resources such as a central processing unit (CPU) or hardware or software control logic. Additional components or information handling system 102 may include one or more storage devices, one or more communications ports for communicating with external devices as well as various input and output (I/O) devices, such as a keyboard, a mouse, and a video display. Information handling system may also include one or more buses operable to transmit communication between the various hardware components. This disclosure contemplates any suitable number of information handling systems 102. Where appropriate, information handling system 102 may include one or more information handling systems 102, be unitary or distributed, span multiple locations, span multiple machines, span multiple data centers, or reside in a cloud, which may include one or more cloud components in one or more networks.

In particular embodiments, information handling system 102 includes processor 103, memory 104 communicatively coupled to processor 103, controller 106, disk drive 110, and disk drive 120. Although this disclosure describes and illustrates a particular information handling system having a particular number of particular components in a particular arrangement, this disclosure contemplates any suitable information handling system having any suitable number of any suitable components in any suitable arrangement.

Processor 103 may, in various embodiments, comprise any system, device, or apparatus operable to interpret and/or execute program instructions and/or process data. Processor 103 may include one or more: microprocessors, microcontrollers, digital signal processors (DSP), application specific integrated circuits (ASIC), or another digital or analog circuitry configured to interpret and/or execute program instructions and/or process data. In some embodiments, processor 103 may interpret and/or execute program instructions and/or process data stored locally (e.g., in memory 104). In the same or alternative embodiments, processor 103 may interpret and/or execute program instructions and/or process data stored remotely.

Memory 104 may, in various embodiments, comprise any system, device, or apparatus operable to retain and/or retrieve program instructions and/or data for a period of time (e.g., computer-readable media). Memory 130 may comprise one or more modules; such modules can include random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 102, is powered down.

In particular embodiments, information handling system 102 may include disk array 108. Disk array 108 may comprise any system, device, or apparatus having a plurality of computer-readable storage media (e.g., disk drives 110 and 120) communicatively coupled to information handling system 102 via controller 106. Disk array 108 may include a plurality of disk drives, for example disk drives 110 and 120. In some embodiments, disk array 108 may form all or part of a redundant storage array, such as a Redundant Array of Independent Disks (RAID) configuration. For instance, disk array 108 may be configured as a Level 1 RAID configuration (RAID 1 configuration), wherein an exact copy, or mirror, of a set of data is stored on two or more disk drives. In some embodiments, at least two disk drives (e.g. 110 and 120) included in the plurality of disk drives may form a disk drive set and/or a disk drive pair. For example, the disk drive pair may be configured as a RAID 1 disk drive pair, with a first disk drive 110 of the disk drive pair mirroring data of (e.g., storing a same set of data as) a second disk drive 120 of the disk drive pair. In some embodiments, multiple disk drive pairs (e.g., multiple RAID disk drive pairs) may be formed by disk drives included in the plurality of disk drives of the disk array 108.

Disk array controller 106 may, in various embodiments, comprise any suitable system, device, or apparatus that manages disk array 108. In some embodiments, controller 106 may be communicatively coupled to disk array 108, processor 103, and memory 104. In particular embodiments, controller 106 may be a hardware or hardware-based disk array controller, a software, software-based, or operating-system-based disk array controller, and/or a firmware or driver-based disk array controller. Disk array controller 106 may be configured for managing distribution of data across the plurality of disk drives 110 and 120 of disk array 108. Controller 106 may perform the data distribution management in response to commands (e.g., read commands, write commands) received by controller 106 from processor 103. In some embodiments, controller 106 may comprise a RAID controller. For example, if RAID is implemented using disk array 108, then controller 106 may configure how stored data is mirrored and/or striped across the plurality of disk drives 110 and 120. In some embodiments, one or more aspects of controller 106 may be: an integral part of a storage enclosure housing disk array 108, an integral part of information handling system 102, embedded into the firmware or software of the operating system of system 102, and/or embedded in one or both of disk drives 110 and 120.

In some embodiments, information handling system 102 comprises one or more disk drives, such as disk drive 110 and disk drive 120, which may each be communicatively coupled to controller 106. Disk drives 110 and 120 may comprise any suitable system, device, or apparatus used for storing and retrieving digital information; for example, disk drives 110 and 120 may be hard disk drives (HDD), serial advanced technology attachment (SATA) drives, parallel advanced technology attachment (PATA) drives, or integrated drive electronics (IDE) drives. Disk drives 110 and 120 may consist of one or more rotating disks (e.g., platters) that contain two surfaces for data storage on each side of the disks, for example disks 113, 115, 117 and 123, 125, and 127. Disks 113, 115, 117, 123, 125, and 127 may have magnetic heads and may be arranged on a moving actuator arm to read data from, and write data to, the disk surfaces. In certain embodiments, disk drives 110 and 120 may comprise a mirrored set in a RAID configuration such that their individual disks contain the same set of data. For example, disk 113 and disk 123 may have identical data (or substantially identical data). As another example, disk 117 and disk 125 may have identical data (or substantially identical data). In certain embodiments, a mirrored set comprises two disks, each with identical data but with the data being in different locations on each disk.

Modifications, additions, or omissions may be made to the systems described herein without departing from the scope of the disclosure. For example, information handling system 102 may include any number of controllers 106, processors 103, memories 104, disk arrays 108, or hard disk drives 110 or 120. The components may be integrated or separated. Moreover, the operations may be performed by more, fewer, or other components. Additionally, the operations may be performed using any suitable logic comprising software, hardware, and/or other logic.

Figure 2:
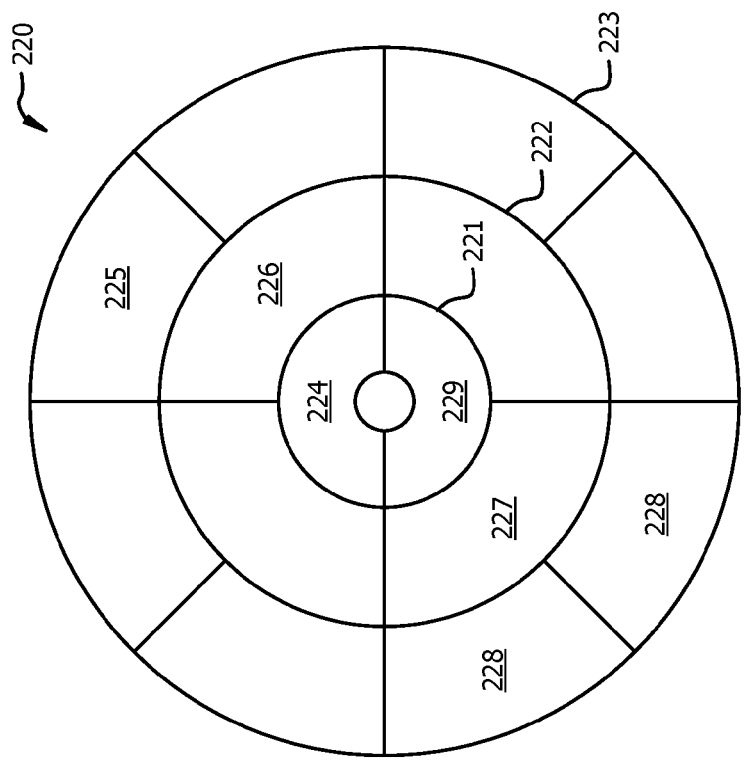
FIG. 2 illustrates a mirrored pair of disks of an embodiment of an information handling system.
Figure 2:
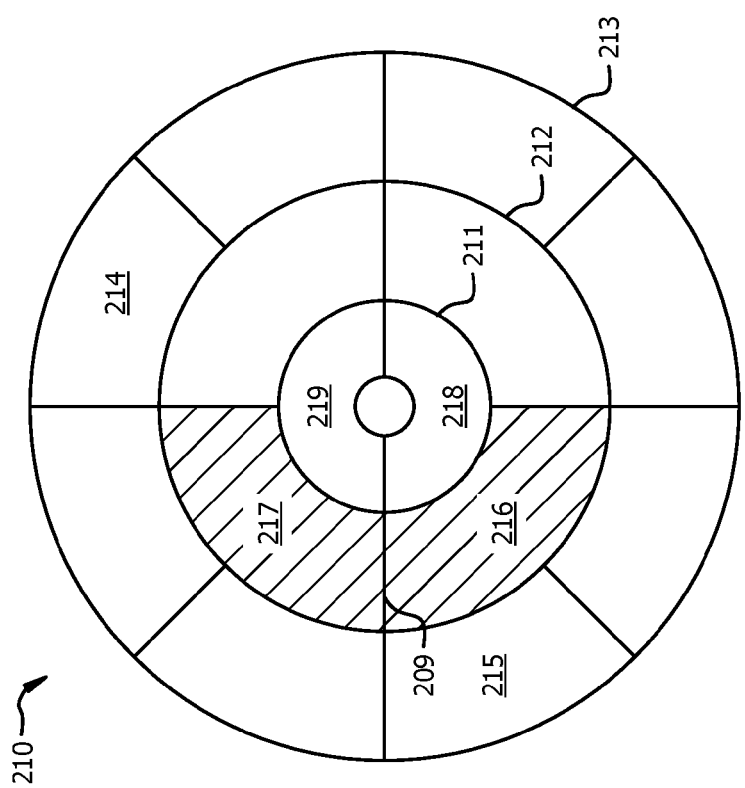

FIG. 2 illustrates two surfaces of two separate disks 210 and 220 (e.g., one from disk drive 110 and one from disk drive 120). Disks 210 and 220 include the same (or substantially the same) data but stored in different locations on each disks 210 and 220. For example, disk 210 may be a disk of disk drive 110 (e.g. disk 115) and disk 220 may be a disk of disk drive 120 (e.g. disk 125). Disk 210 and disk 220 may comprise a plurality of sectors, for example sectors 214, 216, 217, 218, 219, 224, 225, 226, 227, 228, and 229. Although depicted with a certain number of sectors, in various embodiments, disk 210 and disk 220 may comprise any suitable number of sectors. Disk 210 and disk 220 also may comprise a plurality of tracks 211, 212, 213, 221, 222, and 223. Although each are depicted with three tracks, disk 210 and disk 220 may comprise any suitable number of tracks in various embodiments. In some embodiments, a track is a circular area comprising one or more sectors. For example, on disk 210, track 213 comprises sector 214 and sector 215, track 212 comprises sector 216 and sector 217, and track 211 comprises sector 218 and sector 219. Similarly on disk 220, track 223 comprises sector 228 and 225, track 222 comprises sector 226 and sector 227, and track 221 comprises sector 224 and sector 229. In certain embodiments, disk 210 and disk 220 may comprise blocks, which comprise a group of sectors. For example, block 209 is located on disk 210 and comprises sector 216 and sector 217.

In particular embodiments, tracks 211, 212, 213, 221, 222, and 223 may be inner tracks or outer tracks of disks 210 and 220. For example, track 211 and track 221 may be inner tracks of disks 210 and 220, respectively; track 213 and track 223 may be outer tracks of disks 210 and 220, respectively. It should be understood that, in various embodiments, a track need not be the innermost track (e.g., track 211 or 221) to be an inner track and need not be the outermost track (e.g., track 213 or 223) to be an outer track. For example, track 212 may be an inner track because it is closer to the center of disk 210 than track 213. Similarly, track 221 may be an inner track because it is closer to the center of disk 220 than track 223. As another example, track 212 may comprise an outer track because it is closer to the outside edge of disk 210 than track 211. Similarly, track 221 may comprise an outer track because it is closer to the outside edge of disk 220 than track 221.

In some embodiments, with reference to FIGS. 1 and 2, system 102 may operate as follows. Controller 106 may be configured to receive a write request and determine a first portion of information associated with the write request. Controller 106 is further configured to determine a first location on disk 210 to write the first portion of information, and based on the determined first location on disk 210, determine a second location on disk 220 to write the first portion of information. For example, controller 106 may determine the first location comprises sector 215 on outer track 213 of disk 210. Based on this determination, controller 106 may determine the second location comprises sector 224 on inner track 221 of disk 220. Controller 106 is further configured to write the first portion of the information to the first location on the first disk and write the first portion of the information to the second location on the second disk. In some embodiments, information handling system 102 and its components may repeat this process until all the information associated with the write request is written to both disk 210 and disk 220.

Controller 106, in certain embodiments, is further configured to receive a read request for a first information, the first information stored on both disk 210 and disk 220. For example, controller 106 may receive a read request for the information that was, in the previous example, written to sector 215 on outer track 213 of disk 210 and sector 224 on inner track 221 of disk 220. Controller 106 is further configured to determine a first location on disk 210 corresponding to the read request. In this example, controller 106 determines the first location on disk 210 is sector 215 of disk 210. Controller 106 is further configured to determine whether the first location is outer track 212 or 213 of disk 210, and in response to determining that the first location is outer track 212 or 213 of disk 210, direct the read request to disk 210 rather than disk 220. In this example, controller 106 determines that sector 215 is on outer track 213 of disk 210 and in response to that determination, reads disk 210. This can allow for a faster data transfer rate because sector 215 is on outer track 213. If controller 106 determines the first location is not an outer track of disk 210, then controller 106 directs the read request disk 220.

For example, controller 106 may receive one or more read requests for "ABC." Controller 106 can split up the request(s) into portions of information, for example portions "A," "B," and "C." If "A" is located both in sector 219 on disk 210 and sector 227 on disk 220, controller 106 would determine that sector 219 is not an outer track of disk 210. Based on the determination that the information on disk 210 is not an outer track, controller 106 would direct the read request to disk 220 and cause it to be read from sector 227. By reading "A" from track 222 (in this example, an outer track), rather than reading "A" from track 211 (an inner track), controller 106 may benefit from a higher data transfer rate. In some embodiments, information handling system 102 and its components may repeat this process for each of "B" and "C" until all the information associated with the read request(s) is read.

Modifications, additions, or omissions may be made to the systems described herein without departing from the scope of the disclosure. For example, disks 210 and 220 of FIG. 2 may include any suitable number of sectors, blocks or tracks. The components may be integrated or separated. Moreover, the operations may be performed by more, fewer, or other components. Additionally, the operations may be performed using any suitable logic comprising software, hardware, and/or other logic.

Figure 3:
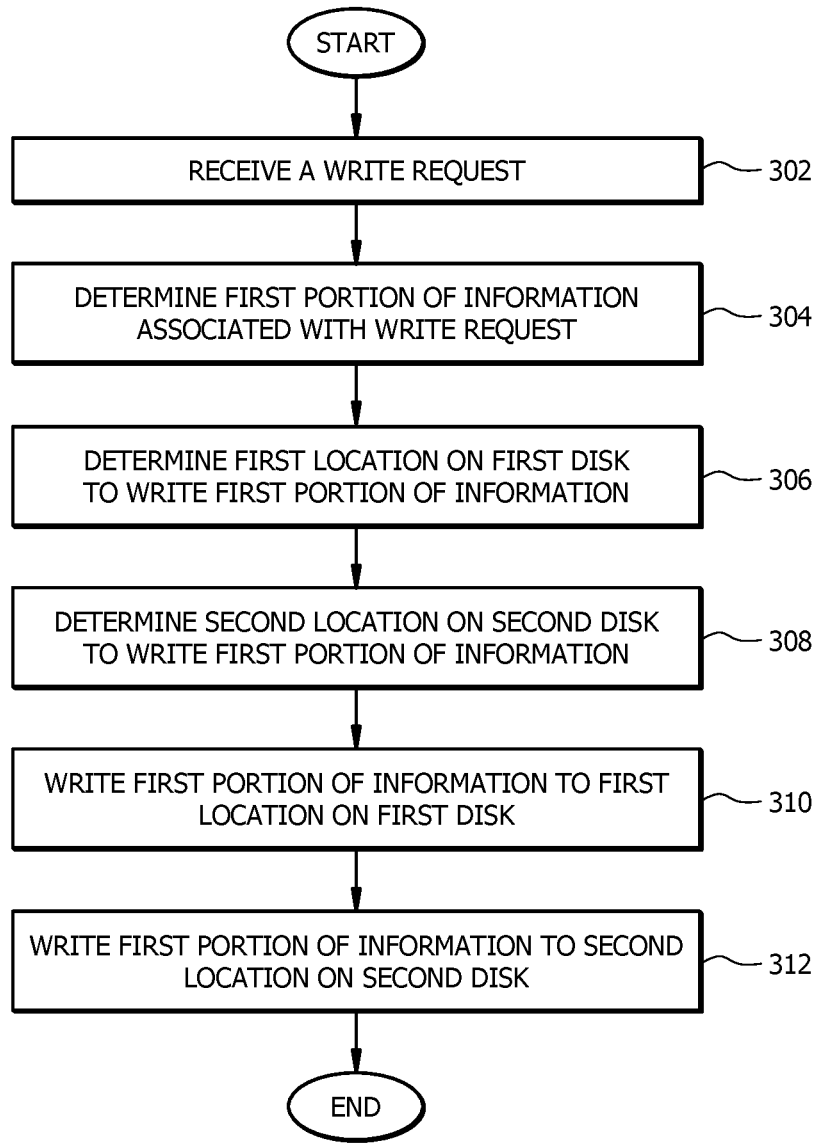
FIGS. 3-5 illustrate flowcharts of examples of writing information to a disk drive.
Figure 4:
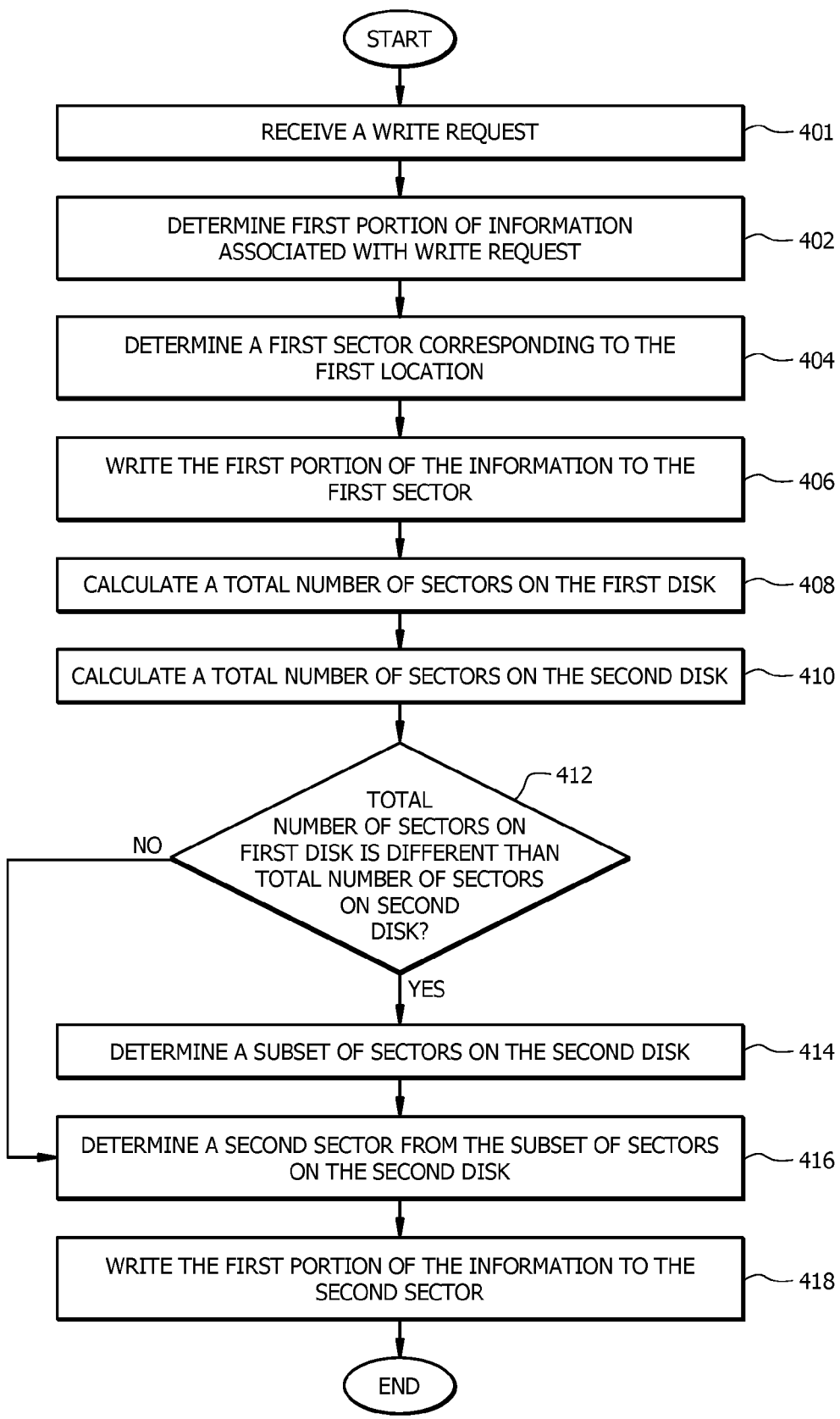
Figure 5:
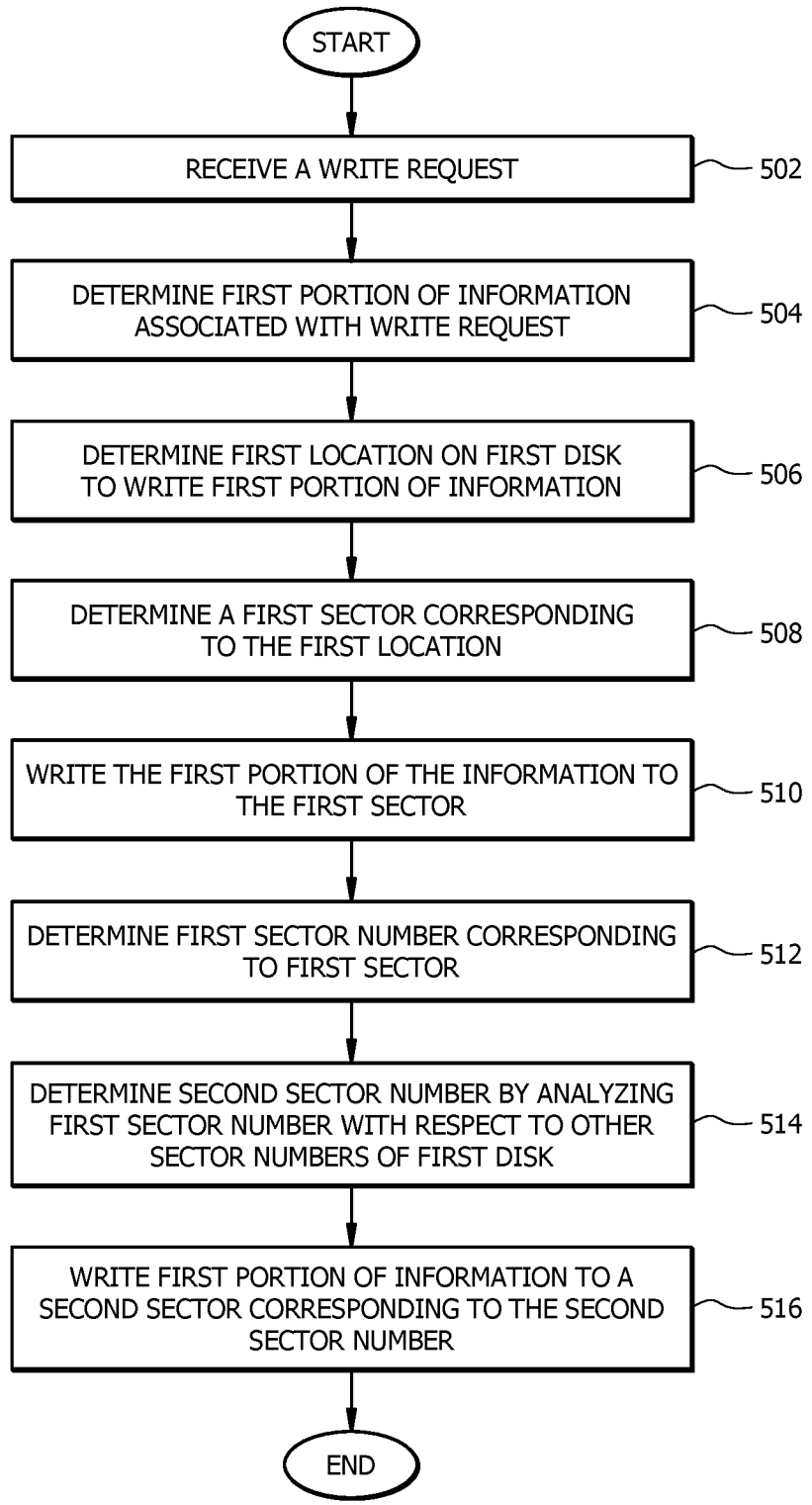
Figure 6:
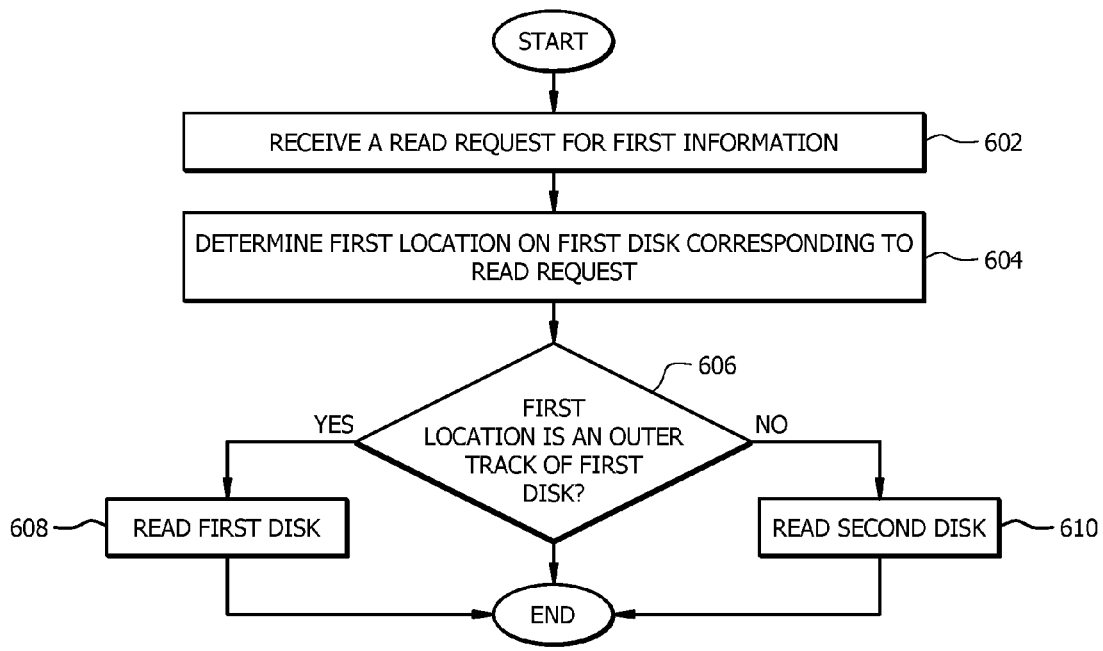
FIGS. 6-9 illustrate flowcharts of examples of reading information from a disk drive.

FIGS. 3 through 5 illustrate flowcharts of examples of writing information to a disk drive. In hard disk drives, in some embodiments, the platter assemblies rotate at a fixed speed, which can mean that angular velocity is constant for any given track 212 on the platter or disk 210. This can result in the time taken for reading, e.g., sector 214, is the same irrespective of where the sector is located, for example, on either inner track 211 or outer track 213. But, since there are more sectors per track on outer track 213, the data transfer rate on outer track 213 can be faster than inner track 211 in various embodiments. It can be beneficial to write information to disk drives 110 and 120 such that the information is placed on an outer track (e.g. tracks 212, 213, 223, and 222) of at least one of disks 210 or 220. This may allow for faster read times and reduced delay in accessing information stored on disk drives 110 and 120 in information handling system 102.

To illustrate examples of writing information to disk drives 110 and 120, the steps below in FIGS. 3 through 5 discuss components of FIGS. 1 and 2. In particular embodiments, one or more aspects of information handling systems 102 perform one or more steps of one or more methods described or illustrated herein. For example, software running on one or more information handling systems 102 performs one or more steps of one or more methods described or illustrated herein or provides functionality described or illustrated herein. Particular embodiments include one or more portions of one or more information handling systems 102 (e.g., controller 106). Modifications, additions, or omissions may be made to the methods described in FIGS. 3 through 5 without departing from the scope of the disclosure. For example, the steps may be combined, modified, or deleted where appropriate, and additional steps may be added. Additionally, the steps may be performed in any suitable order without departing from the scope of the present disclosure. While discussed as controller 106 and its components performing the steps, any suitable component of information handling system 102 may perform one or more of the steps.

At step 302, in some embodiments, controller 106 receives a write request. For example, controller 106 may receive the write request as a result of processor 103 and/or memory 104 responding to a user of system 102 causing information to be written to disk drives 110 and 120. The user can use input/output (I/O) device to cause this, such as a keyboard, a mouse, a touchscreen, or a video display.

At step 304, in some embodiments, controller 106 determines a first portion of information associated with the write request. The information associated with the write request may contain any suitable amount or size of information. Controller 106 may determine a first portion of information in order to divide the total information associated with the write request into portions. In certain embodiments, the first portion of information may correspond to the size of a sector, such as the size of sector 214 on disk 210. For example, each sector on disk 210 may store a fixed amount of user-accessible data, such as 512 bytes or 4 kilobytes, and controller 106 may determine an amount of data corresponding to the sector size to determine the first portion of information associated with the write request.

At step 306, in some embodiments, controller 106 determines a first location on a first disk to write the first portion of information. For example, controller 106 may determine any physical or virtual portion of disk 210, such as a particular track, sector, or block. Controller 106 may determine the first location to be an outer track of a disk (e.g., track 213 or track 212 of disk 210). As another example, controller 106 may determine the first location to be track 223 or 222 of disk 220. Controller 106 may determine the first location to be a particular sector on the disk. For example, controller 106 may determine the first location to be sector 214, sector 215, sector 216, or sector 217. As another example, controller 106 may determine the first location to be sector 225, sector 226, sector 227, or sector 228 of disk 220. In certain embodiments, controller 106 may determine the cylinder-head-sector (CHS) address (e.g., a physical or virtual address that corresponds to the particular location on a disk where a piece of information is or can be written) for the first location. In some embodiments, controller 106 may determine the first location to be a block of a disk. For example, controller 106 may determine the first location to be block 209 of disk 210, which comprises sector 216 and sector 217.

Determining the first location to write the first portion of information can be performed in any suitable manner. For example, controller 106 may read disk 210 or disk 220 to determine the locations that can store the first portion of information. As another example, controller 106 may reference data stored in a memory in controller 106 or in memory 104 of information handling system 102 to determine the location. A memory in controller 106 may store a chart detailing locations on disk 210 that already contain data, and therefore are not available to write any information to, and may specify locations on disk 210 that are blank and available for writing. In some embodiments, as controller 106 receives information to write to disks 210 and 220, it may choose a predetermined location on disk 210 and disk 220 to begin writing the information. For example, controller 106 may write the first portion of information to a sector on outer track 213, such as sector 214.

At step 308, in some embodiments, controller 106 determines a second location on a second disk to write the first portion of information. This can be done based on the determined first location on the first disk. For example, the second location can be track 211 or track 212 of disk 210, or to be track 221 or track 222 of disk 220. The second location may be a particular sector on the disk. For example, the second location may be sector 216, sector 217, sector 218, or sector 219 of disk 210, or may be sector 224, sector 229, sector 227, or sector 226 of disk 220. As another example, the second location may be a block, for example block 209 of disk 210.

Determining the second location to write the first portion of information can be performed in any suitable manner. In some embodiments, controller 206 may correlate certain locations on the second disk with locations on the first disk. For example, if controller 106 determines the first location is track 213 on disk 210, then controller 106 may determine what location on disk 220 is correlated with track 213. Controller 106 may determine track 222 is correlated with track 213 and thus determine track 222 is the second location. In some embodiments, controller 106 may determine the second location by finding the innermost sector of disk 220 that does not already have data written to it. For example, if controller 106 determines that the first location is sector 214, which is on the outermost track 213, then controller 106 may read sector 224; if there is no data written to sector 224, then controller 106 may determine that sector 224 is the second location. Other examples of determining the second location are discussed in more detail below. For example, method step 416 in FIG. 4 comprises determining the second location by determining a sector from a subset of sectors on the second disk. As another example, method step 514 in FIG. 5 comprises determining the second location by using sector numbers, the controller determining a sector number corresponding to the second location by analyzing the first sector number with respect to the other sector numbers of the first disk.

At step 310, in some embodiments, controller 106 writes the first portion of information to the first location of the first disk; in step 312, controller 106 writes the first portion of information to the second location on the second disk. In one example, the first location is on an outer track of the first disk, and the second location is on an inner track of the second disk. In certain embodiments, as explained above, an outer track of the first disk may be any track that is not the innermost track on the disk. Also, the first location may be a particular sector or block on the outer track. For example, the first location may be sector 216 on outer track 212 on disk 210. As explained above, in certain embodiments, an inner track of the second disk may be any track that is not the outermost track on the disk. The second location may be a particular sector or block on the inner track. For example, the second location may comprise sector 229 on track 221 on disk 220. After controller 106 has written the first portion of information to the first and second locations, then the method ends.

FIG. 4 illustrates a flowchart of an example of writing information to disk drives 110 and 120. At step 401, in some embodiments, controller 106 receives a write request. For example, controller 106 may receive the write request as a result of processor 103 and/or memory 104 responding to a user of system 102 causing information to be written to disk drives 110 and 120. The user can use input/output (I/O) device to cause this, such as a keyboard, a mouse, a touchscreen, or a video display. At step 402, in some embodiments, controller 106 determines a first portion of information associated with the write request. This determination may be based on receiving a write request with a set of data that controller 106 breaks into multiple portions.

At step 404, in some embodiments, controller 106 determines a first sector corresponding to the first location. Controller 106 may reference data stored in a memory in controller 106 or memory 104 of system 102 to determine the first sector. In some embodiments, as controller 106 receives information to write to disk 210 and 220, it may choose a predetermined sector on disk 210 and disk 220 to begin writing the information. At step 406, in some embodiments, controller 106 writes the first portion of information to the first sector.

At step 408, in some embodiments, controller 106 calculates a total number of sectors on the first disk, and, at step 410, in some embodiments, controller 106 calculates a total number of sectors on the second disk. Controller 106 may calculate the total number of sectors on each disk in various ways. For example, controller 106 may read a disk to determine or calculate its total number of sectors. As another example, the total number of sectors on each disk may be stored in memory 104 and controller 106 may retrieve those values. As another example, controller 106 may store the amount of total capacity of a disk in memory 104 (e.g., 51.2 kilobytes) and divide that number by the size of a sector (e.g., 512 bytes) to determine that the total number of sectors on that disk (e.g., 100 sectors).

At step 412, in some embodiments, controller 106 determines whether the total number of sectors on the first disk is different than the total number of sectors on the second disk. For example, controller 106 may determine that disk 210 and disk 220 are different sizes (e.g., contain different storage capacities). If the total number of sectors on the first disk is different than the total number of sectors on the second disk, then the method proceeds to step 414. If the total number of sectors on the first disk is not different than the total number of sectors on the second disk, then the method proceeds to step 416.

At step 414, in some embodiments, controller 106 determines a subset of sectors on the second disk. Assuming the first disk has fewer sectors than the second disk, the subset of sectors can be any suitable number of sectors less than the total number of sectors on the second disk. The number of sectors in the subset of sectors determined at this step can be the total number of sectors on the first disk. For example, if controller 106 determines the total number of sectors on the first disk is 100 and the total number of sectors on the second disk is 200, then the subset of sectors determined at step 414 will be 100 sectors.

In step 416, in some embodiments, controller 106 determines a second sector from the subset of sectors on the second disk. If controller 106 determines in step 412 that the total number of sectors on the first disk is not different than the total number of sectors on the second disk, then the subset of sectors on the second disk in step 416 may be the total number of sectors on the second disk. If controller 106 determines in step 412 that the total number of sectors on the first disk is different than the total number of sectors on the second disk, then the subset of sectors on the second disk in step 416 may be the subset of sectors determined in step 414. Controller 106 may determine the second sector based on the determination of the first sector that occurred at step 404. For example, if controller 106 determines the first sector is on an outer track of the first disk, then controller 106 may determine the second sector to be one that is on an inner track of the second disk. In step 418, in some embodiments, controller 106 writes the first portion of the information to the second sector and the method ends.

In some embodiments, the steps of FIG. 4 may be repeated for multiple portions so that a write request may be fully serviced. For example, if the data associated with the write request contains multiple portions of information, controller 106 may repeat steps for each portion of information until each portion is written to a first sector on a first disk and a second sector on a second disk in accordance with the steps of FIG. 4.

FIG. 5 illustrates a flowchart of an example of writing information to disk drives 110 and 120. At step 502, in some embodiments, controller 106 receives a write request, at step 504 controller 106 determines a first portion of information associated with the write request, and at step 506 controller 106 determines a first location on the first disk to write the first portion of information. In some embodiments, steps 502-506 of the method illustrated in FIG. 5 can be performed using one or more of the techniques discussed above with respect to steps 302-306 of FIG. 3.

At step 508, in some embodiments, controller 106 determines a first sector corresponding to the first location and controller 106 writes the first portion of information to the first sector of the first disk in step 510. In some embodiments, steps 508-510 of FIG. 5 can be performed using one or more of the techniques discussed above with respect to steps 404-406 of FIG. 4.

At step 512, in some embodiments, controller 106 determines the first sector number corresponding to the first sector. In certain embodiments, the sectors may be numbered sequentially beginning at the outer most track of the disk continuing around the concentric circles of each track and moving inward. For example, with reference to FIG. 2, sectors may be numbered as follows: sector 214 has a sector number of 0, sector 215 has a sector number of 5, sector 216 has a sector number of 10, sector 217 has a sector number of 11, sector 219 has a sector number of 12, and sector 218 has a sector number of 13. As another example, the sectors may be numbered sequentially beginning at the innermost track of the disk continuing around the concentric circles of each track and moving outward. For example, sector 219 has a sector number of 0, sector 128 has a sector number of 1, sector 216 has a sector number of 2, sector 217 has a sector number of 3, sector 215 has a sector number of 7, and sector 214 has a sector number of 10. In certain embodiments, disk 210 and disk 220 may use the same numbering pattern or may use different numbering patterns. In certain embodiments, controller 106 may determine the first sector number by accessing a table in memory 104, by reading the disk, or by numbering the sectors each time controller 106 determines a sector number.

At step 514, in some embodiments, controller 106 determines a second sector number by analyzing the first sector number with respect to other sector numbers of the first disk. The second sector number may correspond to a second sector on a second disk. Controller 106 may determine the position of the first sector number in the range of the other sector numbers. For example, if the first disk comprises sector numbers 0-99 and the first sector number is 95, controller may determine that the first sector number is positioned five slots from the end of the range. Based on this determination and assuming the second disk has the same numbering pattern as the first disk, controller 106 may determine a second sector on the second disk to be positioned five slots from the beginning of the range (e.g., sector number 4). As another example, controller 106 may perform mathematical operations involving the first sector number. For example, if the first disk comprises sector numbers 1-100 and the first sector number is 95, controller 106 may subtract the first sector number from the highest sector number of the first disk to determine the second sector number (e.g., the second sector number may be 5 as a result of subtracting 95 from 100).

At step 516, in some embodiments, controller 106 writes the first portion of information to a second sector corresponding to the second sector number and the method ends.

FIGS. 6 through 9 illustrate flowcharts of examples of reading information from disk drives 110 and 120. As discussed above, it can be beneficial, when reading information from disk drive 110 and 120, to determine which of disk 210 or disk 220 contains the information on one of its outer tracks (e.g., tracks 212, 213, 223, and 222). This may allow for faster read times and reduced delay in accessing information stored on a hard disk drive in information handling system 102.

To illustrate examples of reading information from disk drives 110 and 120, the steps below of FIGS. 6 through 9 discuss components of FIGS. 1 and 2. In particular embodiments, one or more aspects of information handling systems 102 perform one or more steps of FIGS. 6 through 9. For example, software running on one or more information handling systems 102 performs one or more steps of one or more methods described or illustrated herein or provides functionality described or illustrated herein. Particular embodiments include one or more portions of one or more information handling systems 102 (e.g., controller 106). Modifications, additions, or omissions may be made to the methods described in FIGS. 6 through 9 without departing from the scope of the disclosure. For example, the steps may be combined, modified, or deleted where appropriate, and additional steps may be added. Additionally, the steps may be performed in any suitable order without departing from the scope of the present disclosure. While discussed as controller 106 and its components performing the steps, any suitable component of information handling system 102 may perform one or more of the steps.

At step 602, in some embodiments, and controller 106 receives a read request for information; the information is stored on both a first disk and a second disk (e.g., disk drives 110 and 120). As an example, controller 106 may receive the read request from processor 103 or memory 104. As another example, controller 106 may receive this read request as a result of use of an input/output (I/O) device, such as a keyboard, a mouse, a touchscreen, or a video display.

At step 604, in some embodiments, controller 106 determines a first location on the first disk corresponding to the read request. For example, controller 106 may reference data stored in a memory in controller 106 or in memory 104 of information handling system 102 to determine the first location. A memory in controller 106 may store a chart detailing where data is stored on disk 210.

At step 606, in some embodiments, controller 106 determines whether the first location is an outer track of the first disk. Controller 106 may determine whether the first location is an outer track of the first disk in a number of ways. For example, as discussed further below with respect to steps 704-710 of FIG. 7, a first sector number corresponding to the first location may be determined and analyzed with respect to the other sector numbers of the first disk to determine whether the first sector number corresponds to a sector on an outer track of the first disk. Another example, as discussed further below with respect to steps 802-810 of FIG. 8, the difference between the total number of sectors on the first disk and the first sector number corresponding to the first location may be determined and further whether the sector number is less than or equal to that difference may be determined in order to determine whether the sector is on the outer track of the first disk. Another example, as discussed further below with respect to steps 904-910 of FIG. 9, the first sector number corresponding to the first location may be compared to a threshold to determine whether the first location is on an outer track of the first disk.

If controller 106 determines that the first location is an outer track of the first disk in step 606, then controller 106 reads the first disk in step 608 and the method ends. If controller 106 determines that the first location is not an outer track of the first disk in step 606, then controller 106 reads the second disk in step 610 and the method ends. In some embodiments, the steps of FIG. 6 above may be repeated such that an entire read request may be fully serviced. The steps above may be applied to multiple read requests or to portions of information divided up from a read request.

Figure 7:
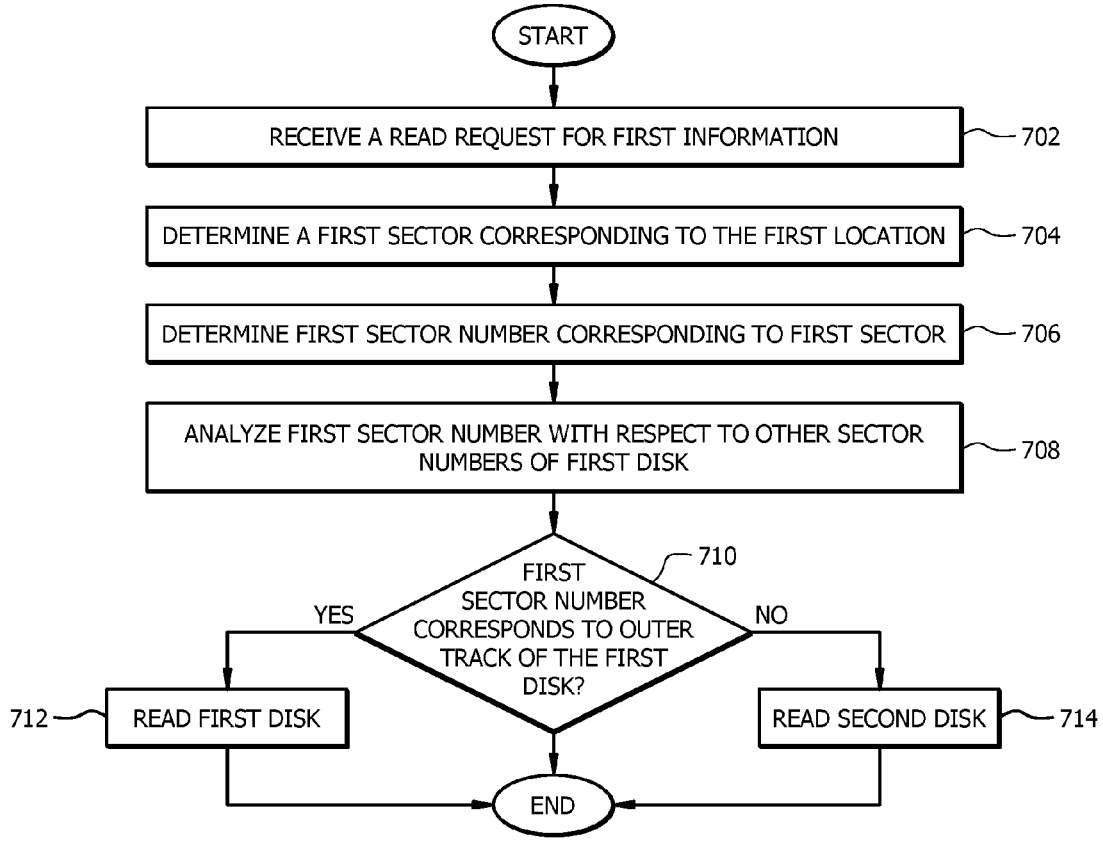

FIG. 7 illustrates a flowchart of an example of reading information from disk drives 110 and 120. At step 702, in some embodiments, controller 106 receives a read request for first information; the information is stored on both a first disk drive and a second disk drive (e.g., disk drives 110 and 120). In some embodiments, step 702 of FIG. 7 can be performed using one or more of the techniques discussed above with respect to step 602 of FIG. 6.

At step 704, in some embodiments, controller 106 determines a first sector corresponding to the first location on the first disk and controller 106 determines a first sector number corresponding to the first sector in step 706. In certain embodiments, controller 106 determines a first sector and a first sector number after receiving a read request in the same manner it determines a first sector and a first sector number after receiving a write request. For example, steps 704 and 706 of the method illustrated in FIG. 7 can be performed using one or more techniques discussed above with respect to steps 508 and 512 of FIG. 5.

In step 708, in some embodiments, controller 106 analyzes the first sector number with respect to other sector numbers of the first disk. Controller 106 may determine the position of the sector number within the range of sector numbers. For example, if the first sector number is 98 and the other sector numbers on the first disk include sector numbers 1-97, 99, and 100, then controller 106 may determine that 98 is in the third position from the end of the range of total sector numbers 1-100. As another example, step 708 of the method illustrated in FIG. 7 can be performed using one or more techniques discussed below with respect to step 808 of FIG. 8, which determine whether the first sector number is less than or equal to the difference between the total number of sectors on the first disk and the first sector number. As another example, step 708 of the method illustrated in FIG. 7 can be performed using one or more techniques discussed below with respect to step 908 of FIG. 9, which compares the first sector number to a threshold.

At step 710, in some embodiments, controller 106 determines whether the first sector number corresponds to an outer track of the first disk. Controller 106 may use the analysis from step 708 to determine whether the first sector number corresponds to an outer track of the first disk in step 710. For example, determining that first sector number 98 is in the third position from the end of the range of sector numbers may indicate that the sector corresponds to an outer track. If controller 106 determines that the first sector number corresponds to an outer track of the first disk in step 710, then controller 106 reads the first disk in step 712 and the method ends. If controller 106 determines that the first sector number does not correspond to an outer track of the first disk in step 710, then controller 106 reads the second disk in step 714 and the method ends. Reading the information from a sector on an outer track of a disk may improve read performance and the speed at which the data is read in various embodiments. Also, this may result in reduced seek time as the disk head does not need to move between tracks because it consistently reads the data from an outer track.

Figure 8:
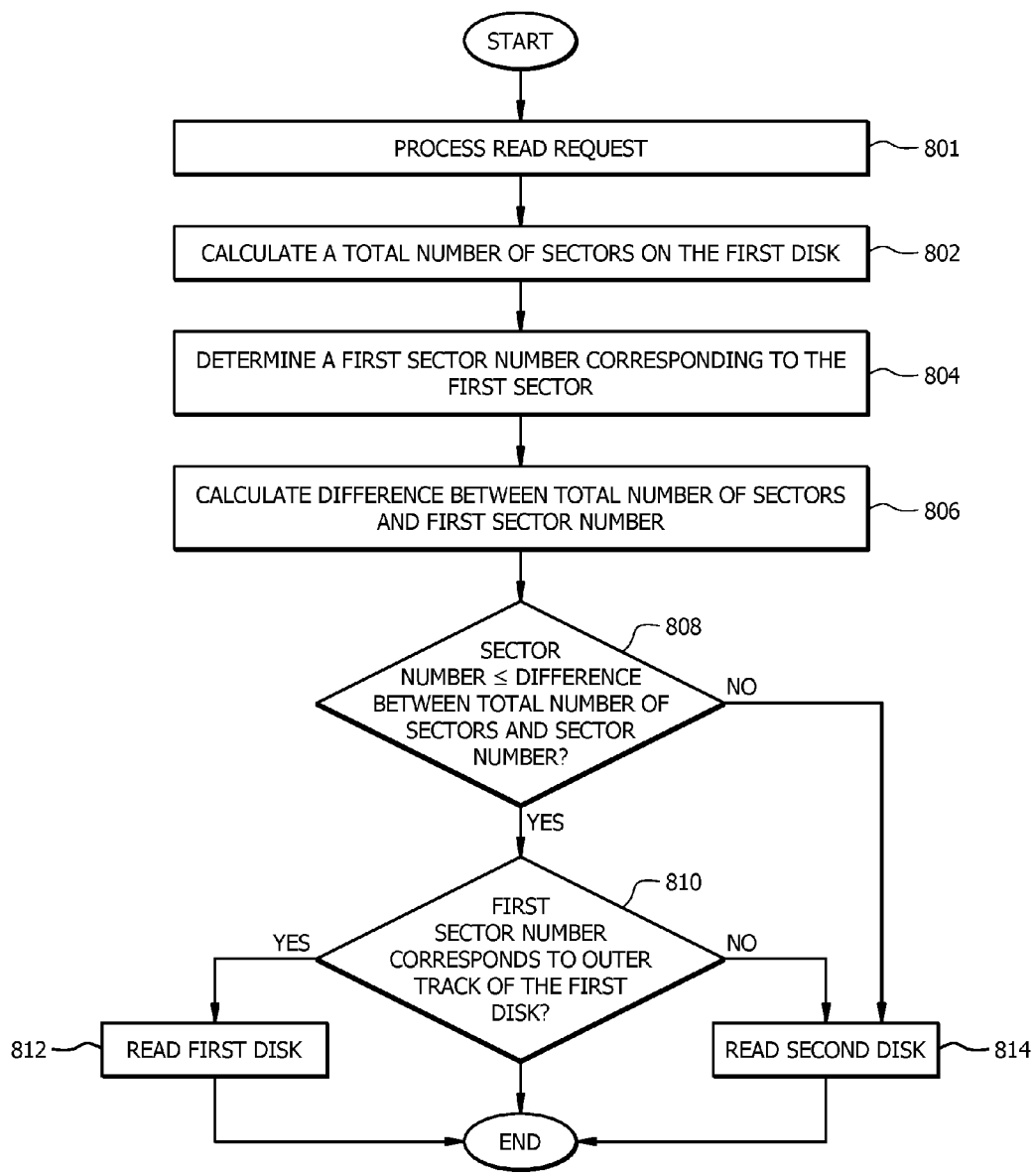

FIG. 8 illustrates a flowchart of an example of reading information from disk drives 110 and 120. At step 801, in some embodiments, controller 106 processes a read request. Processing the read request may include receiving a read request for first information; the information is stored on both a first disk drive and a second disk drive (e.g., disk drives 110 and 120). Processing the read request may also include determining a first sector corresponding to the first location on the first disk. In some embodiments, step 801 of FIG. 8 can be performed using one or more of the techniques discussed above with respect to step 508 of FIG. 5, step 602 of FIG. 6, and steps 702 and 704 of FIG. 7.

At step 802, in some embodiments, controller 106 calculates a total number of sectors on the first disk. For example, step 802 of the method illustrated in FIG. 8 can be performed using one or more techniques discussed above with respect to steps 408 and/or 410 of FIG. 4, which comprise calculating a total number of sectors on the first disk and on the second disk, respectively.

At step 804, in some embodiments, controller 106 determines a first sector number corresponding to the first sector. For example, step 804 of the method illustrated in FIG. 8 can be performed using one or more techniques discussed above with respect to step 512 of FIG. 5 and step 706 of FIG. 7.

At step 806, in some embodiments, controller 106 calculates the difference between the total number of sectors and the first sector number. For example, if the first sector number is 45 and the total number of sectors on the first disk is 100, then controller 106 may determine the difference to be 55.

At step 808, in some embodiments, controller 106 determines whether the first sector number is less than or equal to the difference between the total number of sectors and the first sector number. Using the previous example, controller 106 may determine that first sector number 45 is less than 55 (the difference between the total number of sectors on the first disk and the first sector number). If in step 808 controller 106 determines that the first sector number is not less than or equal to the difference between the total number of sectors and the first sector number, then controller reads the second disk in step 814 and the method ends. If controller 106 determines that the first sector number is less than or equal to the difference between the total number of sectors and the first sector number, then it continues to step 810.

Based on the determination in step 808 that the first sector number is less than or equal to the difference between the total number of sectors and the first sector number, at step 810, in some embodiments, controller 106 determines whether the first sector number corresponds to an outer track of the first disk. Controller 106 can use the determination from step 808 to determine whether the first sector number corresponds to an outer track of the first disk. For example, since first sector number 45 is less than 55, which is the difference between the total number of sectors on the first disk and the first sector number, then controller 106 may determine that the first sector number 45 corresponds to an outer track of the first disk.

If, in step 810, controller 106 determines that the first sector number corresponds to an outer track of the first disk, then controller 106 reads the first disk in step 812, in some embodiments, and the method ends. If, in step 810, controller 106 determines that the first sector number does not correspond to an outer track of the first disk, then controller 106 reads the second disk in step 814, in some embodiments, and the method ends.

Figure 9:
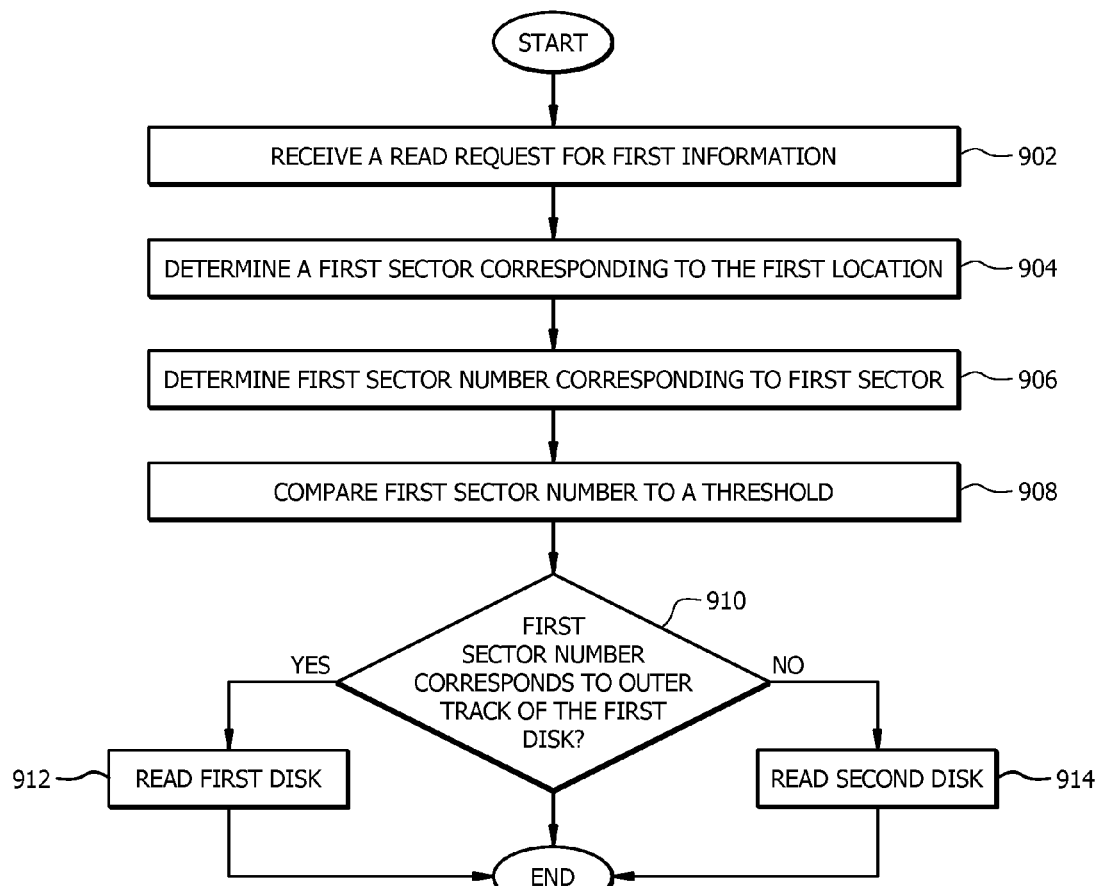

FIG. 9 illustrates a flowchart of an example of reading information from disk drives 110 and 120. At step 902, in some embodiments, controller 106 receives a read request; at step 904 controller 106 determines a first sector corresponding to the first location. For example, step 904 of the method illustrated in FIG. 9 can be performed using one or more techniques discussed above with respect to step 404 of FIG. 4, step 508 of FIG. 5, and step 704 of FIG. 7, which may determine a first sector corresponding to the first location.

An step 906, in some embodiments, controller 106 determines a first sector number corresponding to the first sector. For example, step 906 of the method illustrated in FIG. 9 can be performed using one or more techniques discussed above with respect to step 512 of FIG. 5, step 706 of FIG. 7, and step 804 of FIG. 8.

At step 908, in some embodiments, controller 106 compares the first sector number to a threshold. Controller 106 can determine whether the first sector number is greater than, less than, or equal to the threshold. The threshold may depend on the number of sectors on the disk. As one example, a disk may contain 100 sectors and controller 106 may determine the threshold is half of the total number of sectors on the disk. Continuing the example, controller 106 compares sector number 29 (determined as the first sector number in step 906) to the threshold of 50, and controller 106 may determine first sector number 29 is less than the threshold. In some embodiments, the threshold may be the same for all disks in disk drive 110 and disk drive 120 or the threshold may be different for one or more of the disks. For example, controller 106 may store the thresholds for each individual disk or controller 106 may determine the threshold each time it receives a read request based on the disk.

Based on the comparisons at step 908, at step 910, in some embodiments, controller 106 determines whether the first sector number corresponds to an outer track of the first disk. Controller 106 uses the comparison from step 908 to determine whether the first sector number corresponds to an outer track of the first disk. For example, sector numbers 1 through 50 may be located on one or more outer tracks of the first disk and sector numbers 51 through 100 are located one or more inner tracks of the first disk. By using the threshold of 50, controller 106 may determine whether the first sector number corresponds to an outer track of the first disk. For example, if controller 106 determines that first sector number 29 is less than the threshold of 50 in step 908, it may also determine first sector number 29 corresponds to an outer track.

If in step 910 controller 106 determines that the first sector number corresponds to an outer track of the first disk, then controller 106 reads the first disk in step 912, in some embodiments, and the method ends. If in step 910, controller 106 determines that the first sector number does not correspond to an outer track of the first disk, then controller 106 reads the second disk in step 914, in some embodiments, and the method ends.

Modifications, additions, or omissions may be made to the methods described herein without departing from the scope of the disclosure. For example, the steps may be combined, modified, or deleted where appropriate, and additional steps may be added. Additionally, the steps may be performed in any suitable order without departing from the scope of the present disclosure. While discussed as controller 106 and its components performing the steps, any suitable component of information handling system 102 may perform one or more steps of the method.

Figure 10:
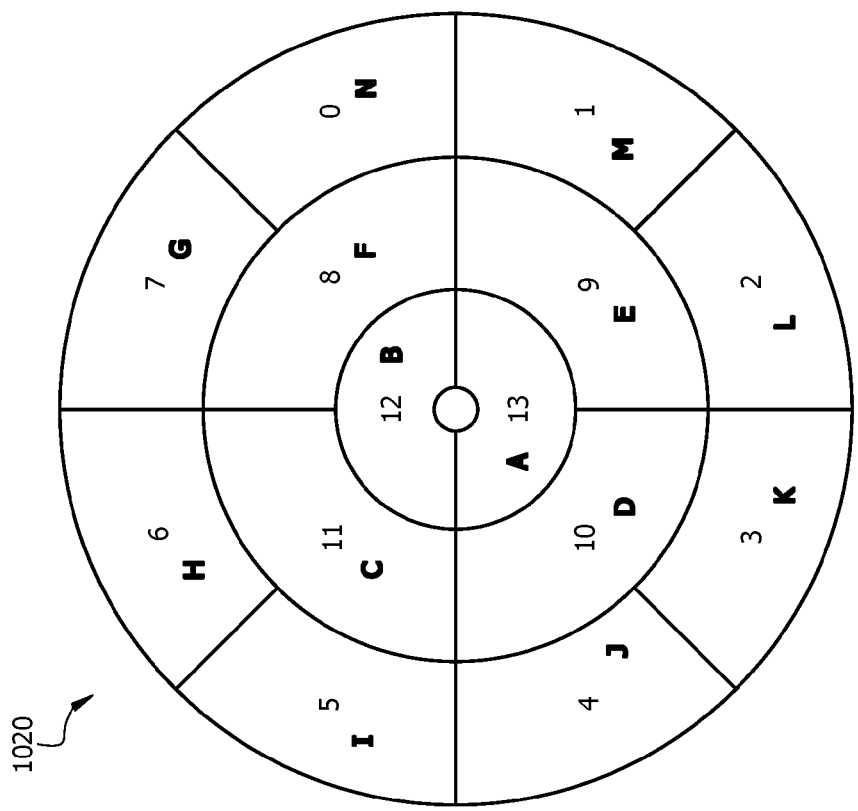
FIG. 10 illustrates a mirrored pair of disks of an embodiment of an information handling system.
Figure 10:
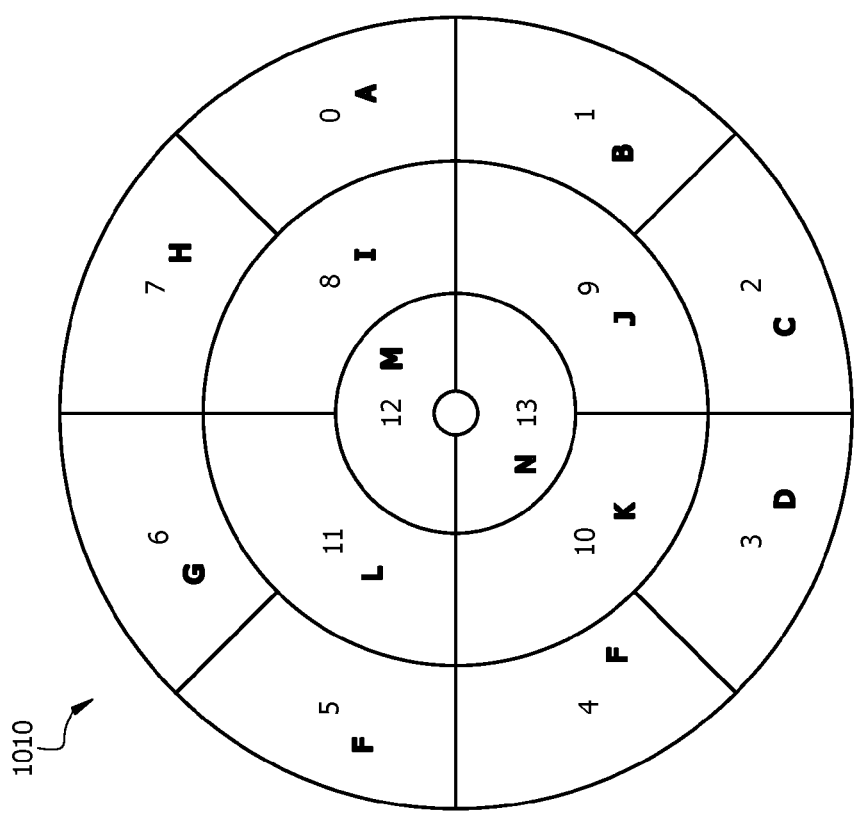

FIG. 10 illustrates a mirrored pair of disks 1010 and 1020 of an embodiment of information handling system 102. In certain embodiments, disk 1010 and disk 1020 comprise 14 sectors, each numbered from 0-13 in the same manner (e.g., numbering the sectors clockwise and moving inward once one all sectors of a track are numbered). With reference to FIG. 1, system 102 may receive a write request for information and controller 106 may determine portions of information associated with the write request (e.g. portions A, B, C, D, E, F, G, H, I J, K, and L). When writing the portions of data, controller 106 may write the first portion of information (e.g., A) to sector 0 on disk 1010 and sector 13 on disk 1020. Controller may then write a second portion of information (e.g. B) to sector 1 on disk 1010 and sector 12 on disk 1020. Controller 106 may continue writing each portion of data to disk 1010 and disk 1020 in the same manner FIG. 10 illustrates the result of performing the write process in this manner. In various embodiments, this can result in information on disk drives being more readily accessible by placing it on an outer track of at least one of the disk drives. Also, this can result in faster read times and reduced delay in accessing information stored on a hard disk drive in an information handling system. For example, if controller 106 receives a read request for data A-L, it may read data A-H from sector numbers 0-7 of disk 1010 and read data I-N from sector numbers 0-7 of disk 1020. In some embodiments, writing data in this manner can reduce seek time because the disk head on each of disk 1010 and disk 1020 do not need to move from an outer track (e.g., the tracks comprising sector numbers 0-7 on each of disks 1010 and 1020).

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
receiving a write request;
determining a first portion of information associated with the write request;
determining a first location on a first disk to write the first portion of information;
based on the determined first location on the first disk, determining a second location on a second disk to write the first portion of information;
writing the first portion of the information to the first location on the first disk, the first location comprising an outer track of the first disk; and
writing the first portion of the information to the second location on the second disk, the second location comprising an inner track of the second disk.

2. The method of claim 1, wherein the first location comprises a first sector and the second location comprises a second sector.

3. The method of claim 1, wherein the first disk and the second disk are in a redundant array of independent disks (RAID) configuration.

4. The method of claim 1, further comprising:
calculating a total number of sectors on the first disk;
wherein determining the first location on the first disk comprises determining a first sector corresponding to the first location;
wherein writing the first portion of the information to the first location on the first disk comprises writing the first portion of the information to the first sector;
calculating a total number of sectors on the second disk;
determining that the total number of sectors on the first disk is the same as the total number of sectors on the second disk;
in response to determining that the total number of sectors on the first disk is the same as the total number of sectors on the second disk, determining a second sector on the second disk;
wherein writing the first portion of the information to the second location on the second disk comprises writing the first portion of the information to the second sector.

5. The method of claim 1, further comprising:
determining a first sector corresponding to the first location;

wherein writing the first portion of the information to the first location on the first disk comprises writing the first portion of the information to the first sector;
determining a first sector number corresponding to the first sector;
determining a second sector number based on the first sector number;
wherein writing the first portion of the information to the second location on the second disk comprises writing the first portion of the information to a second sector corresponding to the second sector number.

6. An information-handling system, comprising:
a processor;
a memory communicatively coupled to the processor;
a controller communicatively coupled to the processor and the memory, the controller configured to:
receive a write request;
determine a first portion of information associated with the write request;
determine a first location on a first disk to write the first portion of information;
based on the determined first location on the first disk, determine a second location on a second disk to write the first portion of information;
write the first portion of the information to the first location on the first disk, the first location comprising an outer track of the first disk; and
write the first portion of the information to the second location on the second disk, the second location comprising an inner track of the second disk.

7. The system of claim 6, wherein the first location comprises a first sector and the second location comprises a second sector.

8. The system of claim 6, wherein the first disk and the second disk are in a redundant array of independent disks (RAID) configuration.

9. The system of claim 6, wherein the controller is further configured to:
calculate a total number of sectors on the first disk;
determine the first location on the first disk by determining a first sector corresponding to the first location;
write the first portion of the information to the first location on the first disk by writing the first portion of the information to the first sector;
calculate a total number of sectors on the second disk;
determine that the total number of sectors on the first disk is the same as the total number of sectors on the second disk;
in response to determining that the total number of sectors on the first disk is the same as the total number of sectors on the second disk, determine a second sector on the second disk; and
write the first portion of the information to the second location on the second disk, wherein the first portion of the information is written to the second sector.

10. The system of claim 6, wherein the controller is further configured to:
determine a first sector corresponding to the first location;
write the first portion of the information to the first location on the first disk by writing the first portion of the information to the first sector;
determine a first sector number corresponding to the first sector;
determine a second sector number based on the first sector number; and
write the first portion of the information to the second location on the second disk, wherein the first portion of the information is written to a second sector corresponding to the second sector number.

11. A non-transitory computer-readable medium including computer-executable instructions encoded in the computer-readable medium, the instructions, when executed by a processor, operable to:
receive a write request;
determine a first portion of information associated with the write request;
determine a first location on a first disk to write the first portion of information;
based on the determined first location on the first disk, determine a second location on a second disk to write the first portion of information;
write the first portion of the information to the first location on the first disk, the first location comprising an outer track of the first disk; and
write the first portion of the information to the second location on the second disk, the second location comprising an inner track of the second disk.

12. The computer-readable medium of claim 11, wherein the first location comprises a first sector and the second location comprises a second sector.

13. The computer-readable medium of claim 11, wherein the first disk and the second disk are in a redundant array of independent disks (RAID) configuration.

14. The computer readable-medium of claim 11, the computer-executable instructions, when executed by the processor, further operable to:
calculate a total number of sectors on the first disk;
determine the first location on the first disk by determining a first sector corresponding to the first location;
write the first portion of the information to the first location on the first disk by writing the first portion of the information to the first sector;
calculate a total number of sectors on the second disk;
determine that the total number of sectors on the first disk is different than the total number of sectors on the second disk;
in response to determining that the total number of sectors of the first disk is different than the total number of sectors on the second disk, determine a subset of sectors on the second disk;
determine the second location on the second disk by determining a second sector from the subset of sectors on the second disk; and
write the first portion of the information to the second location on the second disk by writing the first portion of the information to the second sector.

15. The computer readable-medium of claim 11, the computer-executable instructions, when executed by the processor, further operable to:
determine a first sector corresponding to the first location;
write the first portion of the information to the first location on the first disk by writing the first portion of the information to the first sector;
determine a first sector number corresponding to the first sector;
determine a second sector number by analyzing the first sector number with respect to the other sector numbers of the first disk; and
write the first portion of the information to the second location on the second disk by writing the first portion of the information to a second sector corresponding to the second sector number.

16. The computer readable-medium of claim 11, the computer-executable instructions, when executed by the processor, further operable to:
- calculate a total number of sectors on the first disk;
- determine the first location on the first disk by determining a first sector corresponding to the first location;
- write the first portion of the information to the first location on the first disk by writing the first portion of the information to the first sector;
- calculate a total number of sectors on the second disk;
- determine that the total number of sectors on the first disk is the same as the total number of sectors on the second disk;
- in response to determining that the total number of sectors on the first disk is the same as the total number of sectors on the second disk, determine a second sector on the second disk; and
- write the first portion of the information to the second location on the second disk, wherein the first portion of the information is written to the second sector.

17. The computer readable-medium of claim 11, the computer-executable instructions, when executed by the processor, further operable to:
- determine a first sector corresponding to the first location;
- write the first portion of the information to the first location on the first disk by writing the first portion of the information to the first sector;
- determine a first sector number corresponding to the first sector;
- determine a second sector number based on the first sector number; and
- write the first portion of the information to the second location on the second disk, wherein the first portion of the information is written to a second sector corresponding to the second sector number.

18. A non-transitory computer-readable medium including computer-executable instructions encoded in the computer-readable medium, the instructions, when executed by a processor, operable to:
- receive a read request for a first information, the first information stored on an outer track of a first disk, the first information also stored on an inner track of a second disk;
- determine a first location on the first disk corresponding to the read request;
- determine whether the first location is an outer track of the first disk;
- in response to determining that the first location is an outer track of the first disk, direct the read request to the first disk rather than the second disk.

19. The computer readable-medium of claim 18, wherein the first disk and the second disk are in a redundant array of independent disks (RAID) configuration.

20. The computer readable-medium of claim 18, the computer-executable instructions, when executed by the processor, further operable to:
- determine the first location by determining a first sector; and
- determine whether the first location is an outer track by:
  - determining a first sector number corresponding to the first sector;
  - analyzing the first sector number with respect to other sector numbers of the first disk; and
  - in response to analyzing the first sector number, determining that the first sector number corresponds to the outer track of the first disk.

21. The computer readable-medium of claim 18, the computer-executable instructions, when executed by the processor, further operable to:
- determine the first location by determining a first sector; and
- determine whether the first location is an outer track of the first disk by:
  - calculating a total number of sectors on the first disk;
  - determining a first sector number corresponding to the first sector;
  - calculating the difference between the total number of sectors and the first sector number;
  - determining whether the first sector number is less than or equal to the difference between the total number of sectors and the first sector number; and
  - in response to determining whether the first sector number is less than or equal to the difference between the total number of sectors and the first sector number, determining that the first sector number corresponds to the outer track of the first disk.

22. The computer readable-medium of claim 18, the computer-executable instructions, when executed by the processor, further operable to:
- determine a first location by determining a first sector; and
- determine whether the first location is an outer track of the first disk by:
  - determining a first sector number corresponding to the first sector;
  - comparing the first sector number to a threshold; and
  - in response to comparing the first sector number to a threshold, determining that the first sector number corresponds to the outer track of the first disk.

* * * * *